United States Patent
Shaffer (10) Patent No.: US 9,328,485 B2
(45) Date of Patent: May 3, 2016

(54) FLOW DIVERTER DEVICE

(71) Applicant: General Electric Company, Schenectady, NY (US)

(72) Inventor: Timothy Scott Shaffer, La Grange, KY (US)

(73) Assignee: General Electric Company, Schenectady, NY (US)

( * ) Notice: Subject to any disclaimer, the term of this patent is extended or adjusted under 35 U.S.C. 154(b) by 630 days.

(21) Appl. No.: 13/692,070

(22) Filed: Dec. 3, 2012

(65) Prior Publication Data

US 2014/0151280 A1 Jun. 5, 2014

(51) Int. Cl.
*E03B 1/00* (2006.01)
*E03C 1/02* (2006.01)
*F16K 11/07* (2006.01)
*C02F 1/00* (2006.01)

(52) U.S. Cl.
CPC .............. *E03C 1/023* (2013.01); *F16K 11/07* (2013.01); *C02F 1/003* (2013.01); *C02F 2201/005* (2013.01); *E03C 2201/40* (2013.01); *Y10T 137/265* (2015.04)

(58) Field of Classification Search
CPC .............. E03C 1/023; E03C 2201/40; C02F 2201/005; F16K 11/07; Y10T 137/87579; Y10T 137/265; Y10T 137/8671; Y10T 137/2685; Y10T 137/794; Y10T 137/87676
See application file for complete search history.

(56) References Cited

U.S. PATENT DOCUMENTS

| | | | |
|---|---|---|---|
| 2,583,142 A * | 1/1952 | Frentzel | 401/106 |
| 2,633,324 A * | 3/1953 | Bierman | 137/625.48 |
| 2,972,980 A * | 2/1961 | MacDonald | 401/110 |
| 3,233,865 A | 2/1966 | Panzica et al. | |
| 4,044,789 A | 8/1977 | Elmore | |
| 4,270,575 A * | 6/1981 | Reed et al. | 137/625.69 |
| 4,318,424 A | 3/1982 | Bajka | |
| 4,556,484 A * | 12/1985 | Hunter et al. | 210/90 |
| 4,881,523 A * | 11/1989 | Heckele | 600/131 |
| 5,069,782 A | 12/1991 | Moyher, Jr. et al. | |
| 5,247,966 A * | 9/1993 | Stevens et al. | 137/625.69 |
| 5,279,329 A | 1/1994 | Pippel | |
| 5,510,031 A | 4/1996 | Knauf, Jr. et al. | |
| 5,581,826 A | 12/1996 | Edwards | |
| 6,457,589 B1 | 10/2002 | Poirier et al. | |
| 6,941,968 B2 | 9/2005 | Vidal | |
| 6,978,795 B2 * | 12/2005 | Perrin | 137/119.04 |
| 8,826,932 B2 * | 9/2014 | Seal et al. | 137/119.04 |
| 2007/0023332 A1 * | 2/2007 | Fan | 210/85 |

(Continued)

OTHER PUBLICATIONS

Office action issued in connection with related case U.S. Appl. No. 13/692,105 dated Aug. 14, 2014.

(Continued)

*Primary Examiner* — Jessica Cahill
(74) *Attorney, Agent, or Firm* — Dority & Manning, P.A.

(57) ABSTRACT

A flow diverter device includes a diverter body defining therein a diverter channel that connects with two inlet channels and an outlet channel, and a diverter valve stem including at least two sealing mechanisms. The diverter valve stem is movable between a first position wherein one of the sealing mechanisms engages the diverter channel such that the diverter channel fluidly connects one of the inlet channels with the outlet channel only and a second position wherein another of the sealing mechanisms engages the diverter channel such that the diverter channel fluidly connects the other of the inlet channels with the outlet channel only.

15 Claims, 8 Drawing Sheets

(56) References Cited

U.S. PATENT DOCUMENTS

| | | |
|---|---|---|
| 2008/0110512 A1 | 5/2008 | Giagni et al. |
| 2009/0090414 A1 | 4/2009 | Di Nunzio |
| 2009/0095353 A1 | 4/2009 | Arsin |
| 2009/0211654 A1 | 8/2009 | Nobili |
| 2010/0126613 A1 | 5/2010 | Campbell et al. |
| 2014/0150906 A1 | 6/2014 | Shaffer |
| 2014/0151281 A1 | 6/2014 | Shaffer |

OTHER PUBLICATIONS

Timothy Scott Shaffer, et al, U.S. Appl. No. 13/692,105, filed Dec. 3, 2012.

Timothy Scott Shaffer, et al, U.S. Appl. No. 13/692,081, filed Dec. 3, 2012.

* cited by examiner

FLOW DIVERTER DEVICE

BACKGROUND

The subject matter disclosed herein relates generally to a flow diverter device, and more particularly to a flow diverter device that can be used in a water filtration system.

Various systems exist that aim to partition and/or direct incoming fluids to one or more particular outlets. By way of example, a water filtration system, which can include inlet/ outlet tubing, a manifold and a filter component, receives untreated water, directs the water into a filter media, which subsequently directs the treated/filtered water back out for use.

In furtherance of this example, it is common for consumers to install a water filtration system under their sink and to have the system direct treated water to an auxiliary above-the-sink faucet. However, many consumers find having a second faucet undesirable, as it can be considered a detriment to the overall appearance of the sink and the kitchen. Accordingly, a need exists to produce a more convenient or desirable means of selecting between multiple fluid types (for example, treated or untreated water in the case of a water filtration system) and directing the selected fluid toward a common outlet or destination. Additionally, as power is not always available in various settings, it may be further desirable that the selection means not be electrically actuated, but rather mechanically based.

BRIEF DESCRIPTION OF EXAMPLE EMBODIMENTS OF THE INVENTION

As described herein, the exemplary embodiments of the present invention overcome one or more disadvantages known in the art.

A first aspect of the invention relates to a flow diverter device comprising a diverter body defining therein a diverter channel that connects with two inlet channels and an outlet channel, and a diverter valve stem comprising at least two sealing mechanisms, wherein the diverter valve stem is movable between a first position wherein one of the sealing mechanisms engages the diverter channel such that the diverter channel fluidly connects one of the inlet channels with the outlet channel only and a second position wherein another of the sealing mechanisms engages the diverter channel such that the diverter channel fluidly connects the other of the inlet channels with the outlet channel only.

A second aspect relates to a system comprising a flow diverter device as detailed in the first aspect of the invention above, also comprising a faucet and a water filter apparatus.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF EXAMPLE EMBODIMENTS OF THE INVENTION

As described herein, one or more embodiments of the invention include a flow diverter device. By way of example, a flow diverter device, as detailed in connection with one or more embodiments of the invention, can be incorporated into a system such as a water filtration system (for instance, installed in a domestic setting under a counter in conjunction with a faucet or faucets).

By way of illustration, an example embodiment of the invention includes a flow diverter device provided for filtered and unfiltered water selection directed towards a faucet. Moreover, in such an example embodiment, the flow diverter device can be positioned under the sink and have two inlets and one outlet that offers either filtered or unfiltered water to the sink faucet upon selection by the consumer with the aid of a button on the counter top which is connected to the valve via a sealed stem.

Figure 1:
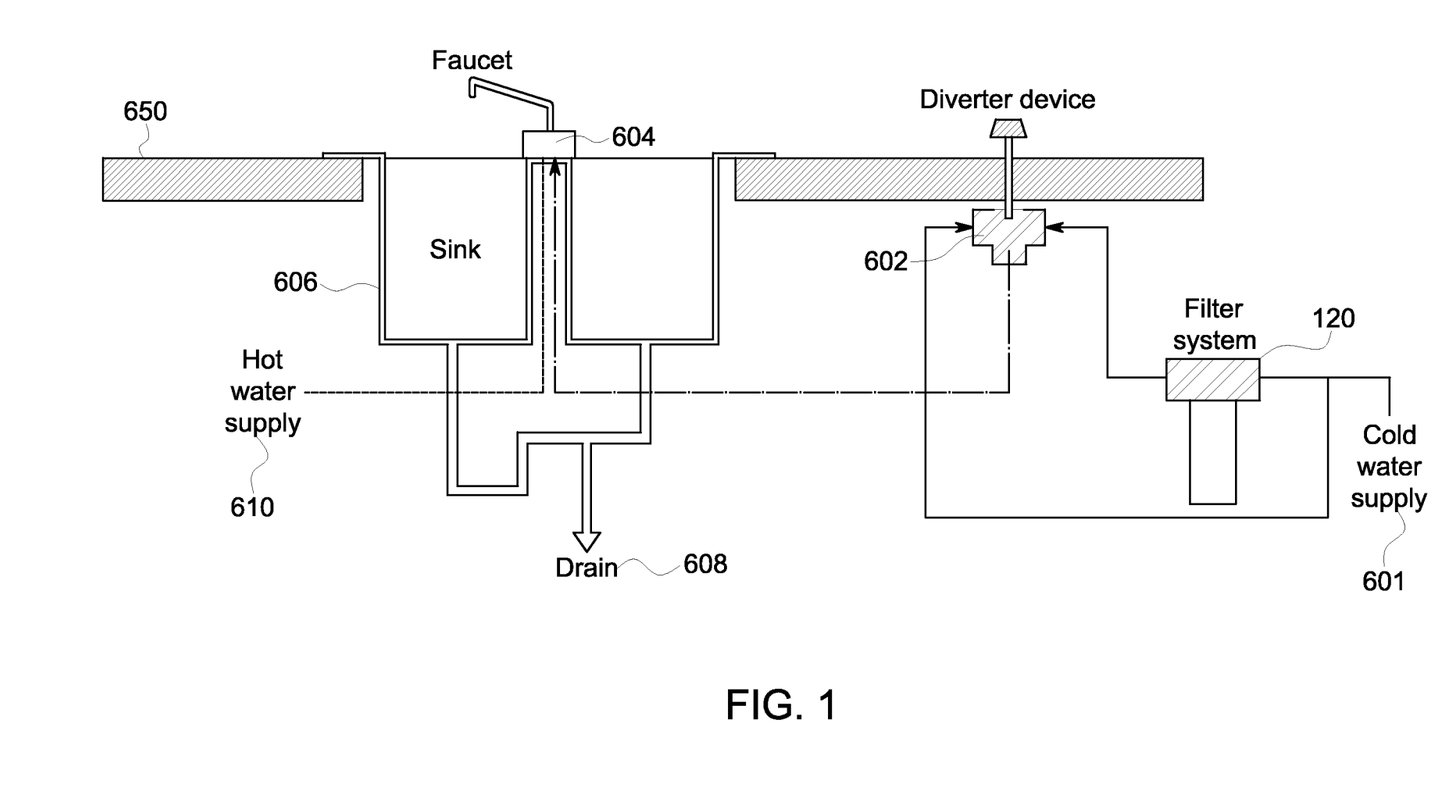
FIG. 1 illustrates a diverter feature in the context of a domestic water system, in accordance with a non-limiting example embodiment of the invention.

FIG. 1 illustrates a diverter feature in the context of a domestic water system, in accordance with a non-limiting example embodiment of the invention. By way of illustration, FIG. 1 depicts a cold water supply 601, which provides cold water to filter apparatus 120 as well as to a diverter device 602. Additionally, the filter apparatus 120 provides filtered water to the diverter device 602. Diverter device 602 can provide a supply of cold and/or filtered water to faucet 604. Also, hot water supply 610 also provides a supply of water to faucet 604. Water (both hot and cold) can ultimately travel from faucet 604 to sink 606 to drain 608. Additionally, as depicted in FIG. 1, an example system such as this one can be implemented in and underneath a surface 650 such as a counter-top.

As further detailed below, at least one embodiment of the invention includes the diverter device 602 directing water from one of two paths, untreated fluid or filtered fluid (for example, water). The diverter device 602 is biased to be open to untreated water when in normal or off operations. When a valve stem of the diverter device 602 is depressed (such as described in connection with FIG. 2), the primary path is closed and retained in the depressed condition via the differential pressure overcoming the biasing spring force. Accordingly, selecting a diverting mode includes the consumer or user manually activating the treated mode. When flow is stopped, differential pressure subsides and spring force pushes the stem back up to normal position.

More specifically, when water is flowing out of the faucet 604 and through a valve body of the diverter device 602, a pressure differential (for example, 4 psi to 50 psi, depending on the flow rate and state of filter clogging) is established across the water filter system. As a consequence of this pressure differential, the pressure of water entering the diverter at filtered inlet port 726 is lower than the pressure of the water at unfiltered inlet 722. When the valve stem is displaced downward to an engaged or treated position, the untreated flow path is blocked and treated flow path is open. When flow is stopped, the pressure differential dissipates and the stem automatically returns to the normal position. The above paragraphs are more fully described below in connection with FIGS. 2-8.

Figure 2:
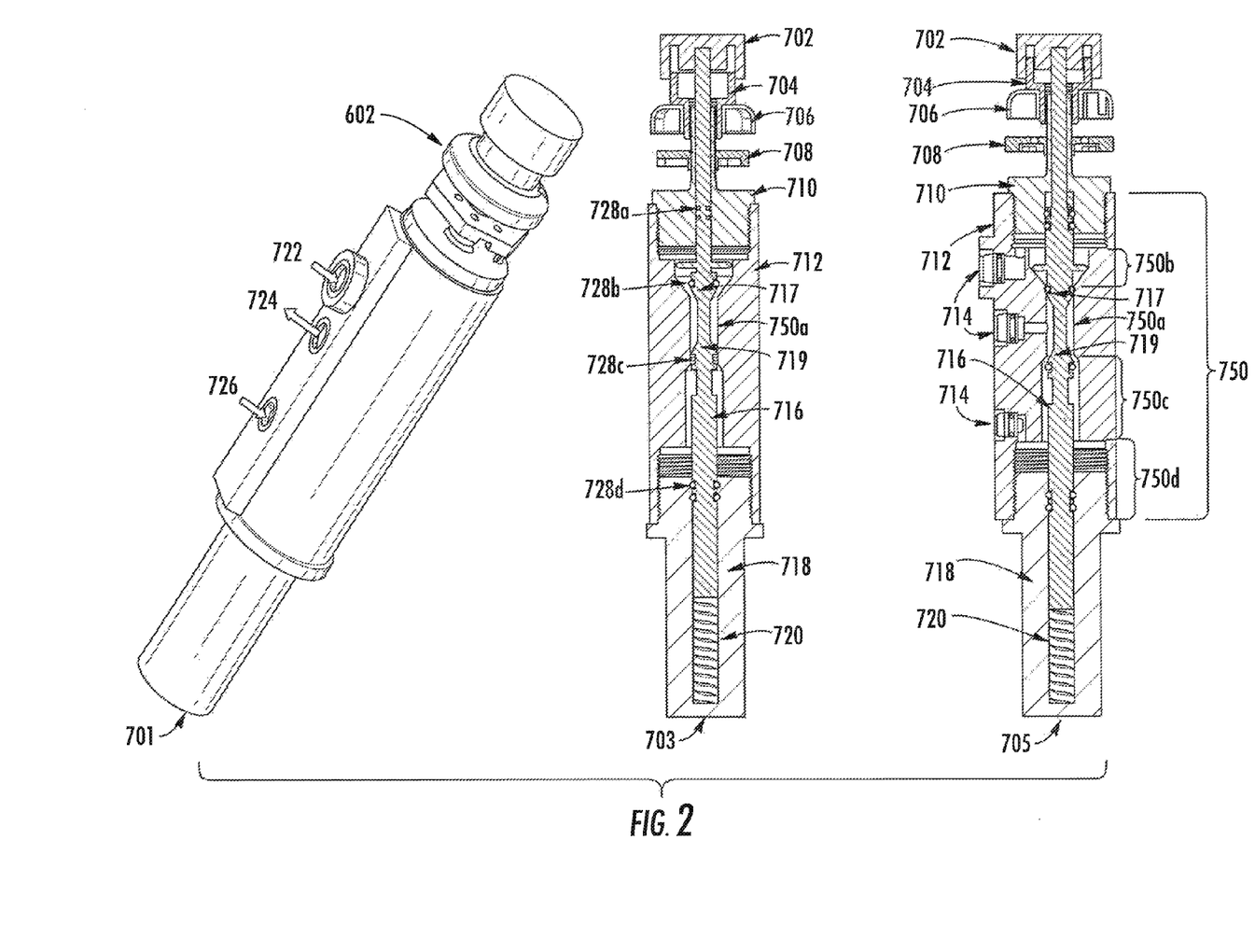
FIG. 2 illustrates an isometric view and cross-section views of the diverter apparatus, in accordance with a non-limiting example embodiment of the invention.

FIG. 2 illustrates an isometric view 701, a cross-section view of the right plane 703 and a cross-section view of the front plane 705 of the diverter device 602, in accordance with a non-limiting example embodiment of the invention. As seen in the illustrated views, an example diverter device 602 includes button 702, which is pushed to activate the diverter feature as described herein, monitor retainer 704, light emitting diode (LED) monitor 706 and vertical locating nut 708. Monitor retainer 704 is a threaded nut (with the threads located on an inner surface, such as illustrated more clearly in FIG. 4 and FIG. 5) that forces the LED monitor 706 down onto a countertop or sink surface (such as surface 650 in FIG. 1). LED monitor 706 is a chrome-plated plastic housing that contains a transparent crystal at a discrete spot on the periphery where an LED bulb is mounted on the underside of the monitor. The LED monitor 706, through appropriate blink patterns and/or light colors, indicates visually when the filter is working and when it is nearing the end of its life. Vertical locating nut 708 is an underside adjustable threaded nut that permits the consumer to tightly position the diverter assembly, for example, such that a countertop (e.g., 650) or sink (e.g., 606) is between the vertical locating nut 708 and the LED monitor 706.

Also, diverter device 602 includes first (or top) plug 710, diverter body 712, stem body portion 716, second (or bottom) plug 718 and compression spring 720. Additionally, in the example illustrated embodiment, the stem body portion 716 includes four sets of sealing engagements (for example, o-rings) 728a-728d, which are described further herein. FIG. 2 also depicts untreated inlet channel 722 (also referred to herein as a first fluid inlet channel) for the introduction of untreated fluid (or a first fluid) into the diverter device 602, outlet channel 724 for the passage of fluid out of the diverter device 602 to a faucet 604, and filtered inlet channel 726 for the introduction of filtered fluid into the diverter device 602. Both inlet channels (722 and 726) and the common outlet channel 724 utilize speed fit cartridges and corresponding o-rings 714. A diverter channel 750 provided in the form of a central bore extending the length of body 712 fluidly connects the inlet and outlet channels.

Specifically, as illustrated in FIG. 2, stem body portion 716 includes two (wider) shoulders 717 and 719, each including a set of the sealing engagements (o-rings) 728b and 728c respectively, and the diverter channel 750 includes a (narrower) neck portion 750a. When the stem body portion 716 is in a position to introduce fluid from inlet channel 722 into diverter channel 750, the o-ring 728c on shoulder 719 sealingly engages with a lower portion of the neck portion 750a of diverter channel 750, creating a seal that precludes fluid from entering the diverter channel 750 from below the seal (while shoulder 717 is not engaged). Similarly, when the stem body portion 716 is in a position to introduce fluid from inlet channel 726 into diverter channel 750, the o-ring 728b on shoulder 717 sealingly engages with an upper portion of the neck portion 750a of diverter channel 750, creating a seal that precludes fluid from entering the diverter channel 750 from above the seal (while shoulder 719 is not engaged).

Figure 4:
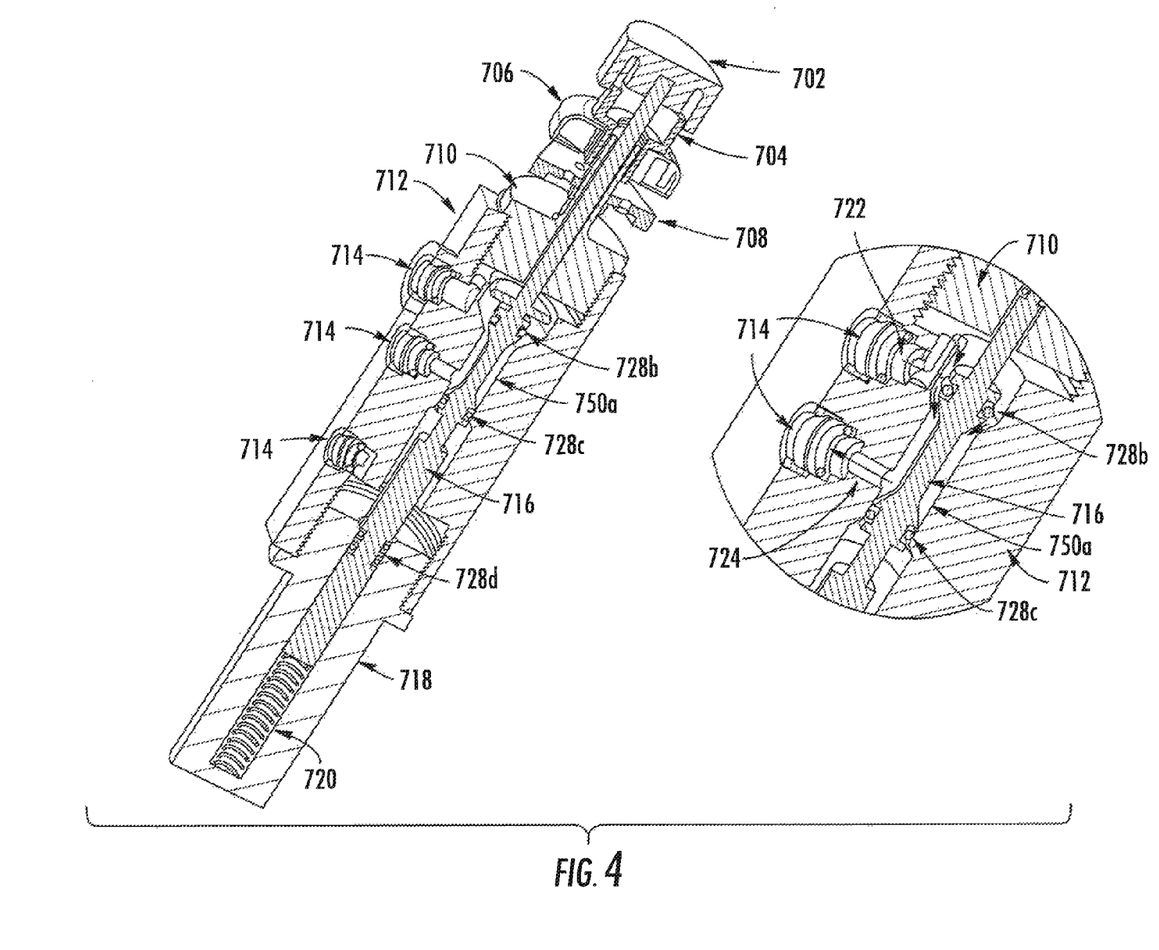
FIG. 4 illustrates a cross-section view of the diverter apparatus in an inactivated stem-up position, in accordance with a non-limiting example embodiment of the invention.

As noted above, surrounding the stem body portion 716 are components of the diverter exterior body, which includes the top plug 710, the diverter body 712 and the bottom plug 718. The top plug 710 includes a central bore to receive the upper portion of stem 716 and connects to diverter body 712 at a first (or upper) portion via external threads which engage the upper internal threaded portion of body 712. The second (or bottom) plug 718 includes a central blind bore to receive the lower portion of stem 716 and at its lowermost extension to retain compression spring 720. Plug 718 includes a set of external threads which engage the lower internal threaded portion of diverter body 712 to seal the diverter body 712 at the bottom of the body portion. As mentioned above, the diverter body 712 includes a diverter channel 750 comprising a central bore which defines the internal flow path between the two inlet channels (722 and 726) and the common outlet channel 724 and provides a common, continuous and cylindrical sealing surface in the central axis for both the treated and untreated paths to the outlet channel 724. The uppermost portion of the bore has a first diameter and the sidewall thereof is threaded to receive the top plug 710. The diameter of the bore steps abruptly down to a second diameter at shoulder 750b. When assembled, the space between the lower face of plug 710 and the shoulder is open to inlet 722 (as best seen in FIG. 4) providing a flow path from inlet 722 to neck portion 750a. The central or neck portion of the bore 750a has a third diameter and the lower portion 750c has a fourth diameter. The third diameter is smaller than the second diameter and the fourth diameter is larger than the third diameter but smaller than the second diameter. An upper transition section extends between the central portion of the bore and the adjacent upper portion tapering down from the second diameter to the third diameter. A lower transition section extends between the central portion and the adjacent lower portion of the bore which expands from the third diameter to the forth diameter. At the lowermost portion of body 712, the diameter expands abruptly at shoulder 750d to a fifth diameter which may be the same as the first diameter. From shoulder 750b to the bottom end of diverter body 712, the sidewall defining the bore is threaded to receive the lower plug 718. When assembled, the space between the upper face of plug 718 and shoulder 750b is open to inlet 726 (as best seen in FIGS. 4 and 5) providing a flow path from the inlet 726 to neck portion 750a.

Figure 3:
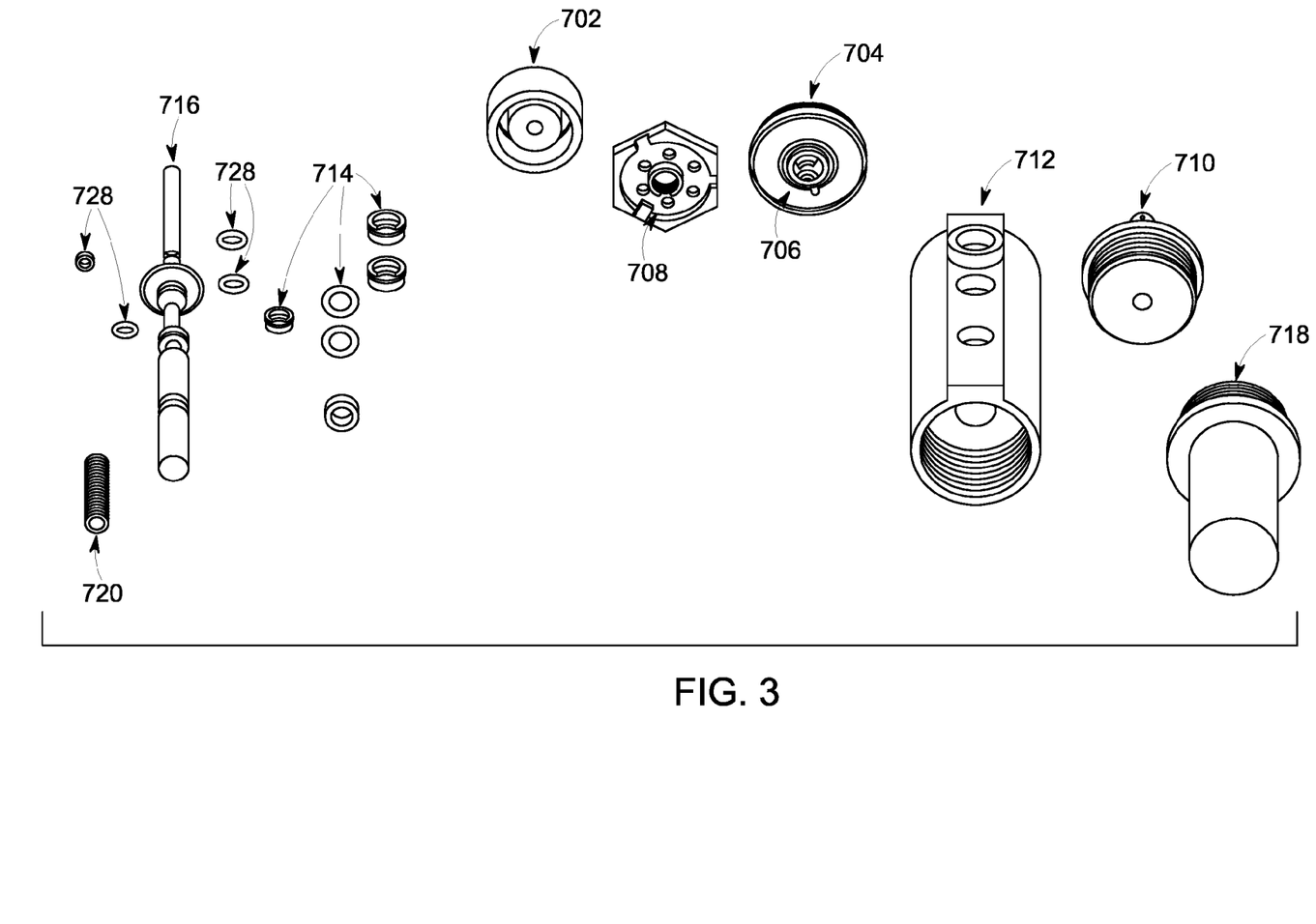
FIG. 3 illustrates an exploded view of various components of the diverter apparatus, in accordance with a non-limiting example embodiment of the invention.

FIG. 3 illustrates an isometric view of various components of the diverter device 602, in accordance with a non-limiting example embodiment of the invention. By way of illustration, FIG. 3 depicts compression spring 720, stem body portion 716 and o-rings 728, as well as speed fit cartridges and corresponding o-rings 714. FIG. 3 additionally depicts button 702, vertical locating nut 708, monitor retainer 704 and LED monitor 706, diverter body 712, top plug 710 and bottom plug 718.

FIG. 4 illustrates a cross-section view of the diverter device 602 in an inactivated stem-up position, in accordance with a non-limiting example embodiment of the invention. In this inactivated stem-up position, button 702 is not pushed-down or depressed toward the monitor retainer 704, LED monitor 706, vertical locating nut 708 and top plug 710. Within the diverter body 712, stem body portion 716 is biased toward its inactivated "up" position within bottom plug 718, by compression spring 720. Additionally, in the stem-up position, the upper o-ring 728b on the stem body portion 716, is displaced from sealing engagement with the sidewall of diverter channel 750, permitting untreated fluid to enter the central portion of the bore of diverter device 602 via untreated inlet channel 722. The fluid enters diverter device 602 and travels around the stem body portion 716 through diverter channel 750 towards outlet channel 724. The fluid flows through and out outlet channel 724. In this position, the lower o-ring 728 of the stem body portion 716 is sealingly engaged with the sidewall of diverter channel 750 to prevent fluid from continuing past its position in the diverter channel 750.

Figure 5:
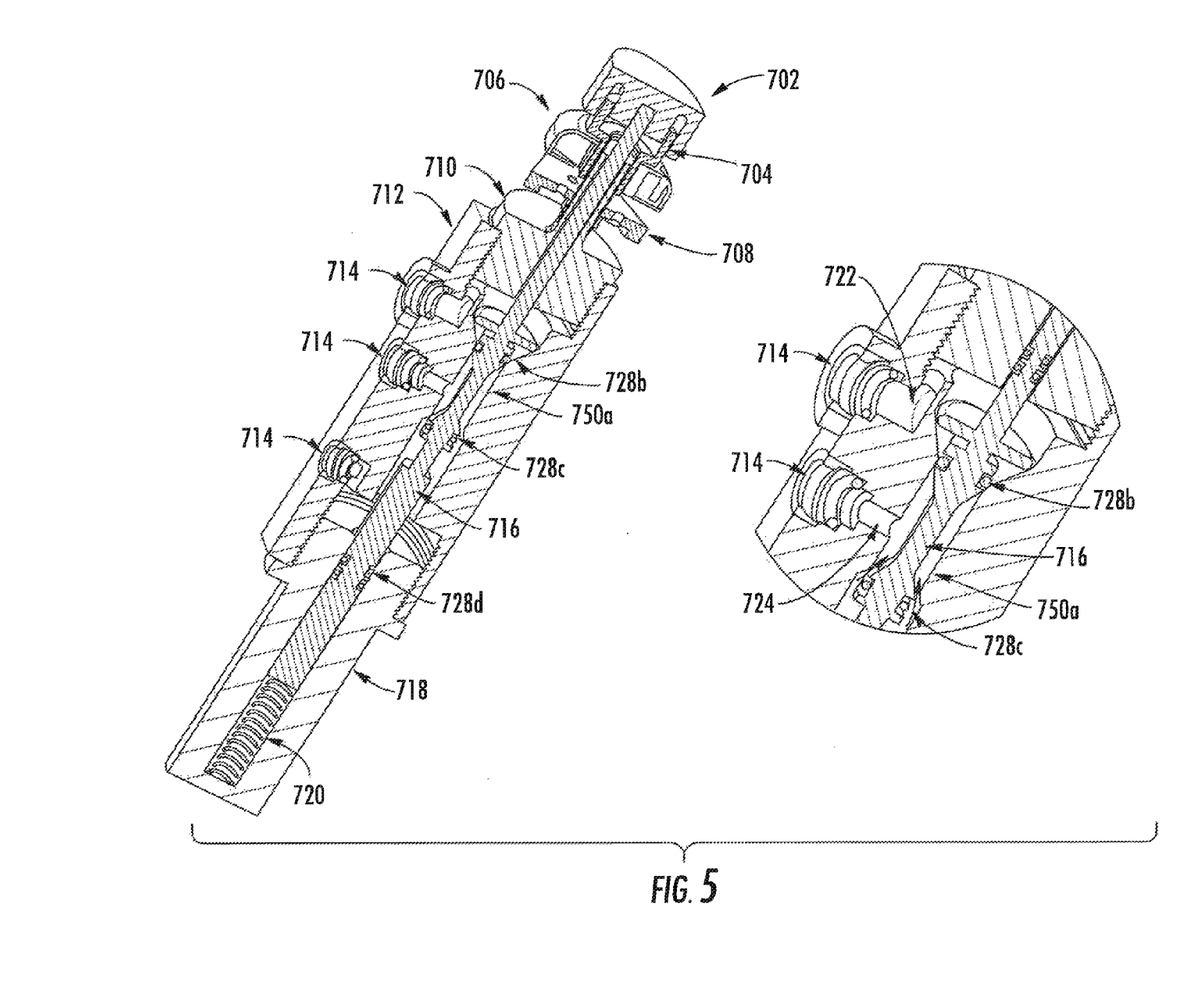
FIG. 5 illustrates a cross-section view of the diverter apparatus in an activated stem-down position, in accordance with a non-limiting example embodiment of the invention.

FIG. 5 illustrates a cross-section view of the diverter device 602 in an activated stem-down position, in accordance with a non-limiting example embodiment of the invention. In this activated stem-down position, button 702 is pushed-down or depressed toward the monitor retainer 704, LED monitor 706, vertical locating nut 708 and top plug 710. Due to pressure loss as the water passes through the filter the pressure exerted by unfiltered water entering the diverter at inlet 722 is higher than the pressure exerted by unfiltered water entering the diverter at inlet 726. The pressure differential forces the stem body portion 716 to stay in the stem-down position until the flow is stopped allowing the pressure to equalize, at which time compression spring 720 pushes stem body portion 716 back to untreated or inactivated position. Also, at least one embodiment of the invention includes designing the spring 720 such that the force exerted by the spring 720 does not exceed the pressure differential when fluid is flowing through the diverter. However, while in the activated position, within the diverter body 712, stem body portion 716 compresses compression spring 720. Additionally, in the stem-down position, upper o-ring 728b on the stem body portion 716, is sealingly engaged with the sidewall of diverter channel 750, creating a seal in diverter channel 750 and precluding untreated fluid from inlet 722 from travelling through diverter channel 750 towards the outlet channel 724. Instead, in this activated mode, fluid enters diverter device 602 via filtered inlet channel 726 and travels around the stem body portion 716 through diverter channel 750 towards outlet channel 724 because the o-ring 728 at the outlet position of the stem body portion 716 is not engaged, permitting fluid to continue around the stem body portion 716 in the diverter channel 750 to the outlet channel 724.

In at least one additional embodiment of the invention, the diverter device 602 can incorporate push-to-activate as well as push-to-deactivate features. As detailed below, such an embodiment can include a latching diverting valve configuration that permits a consumer to select either treated or untreated water using a downward button 702 to activate and hold the selection without any electrical assistance. Accordingly, the consumer can push an above-the-sink button 702 to activate a treated mode and the diverter device 602 will remain in that mode until the button 702 is pushed again.

Figure 6:
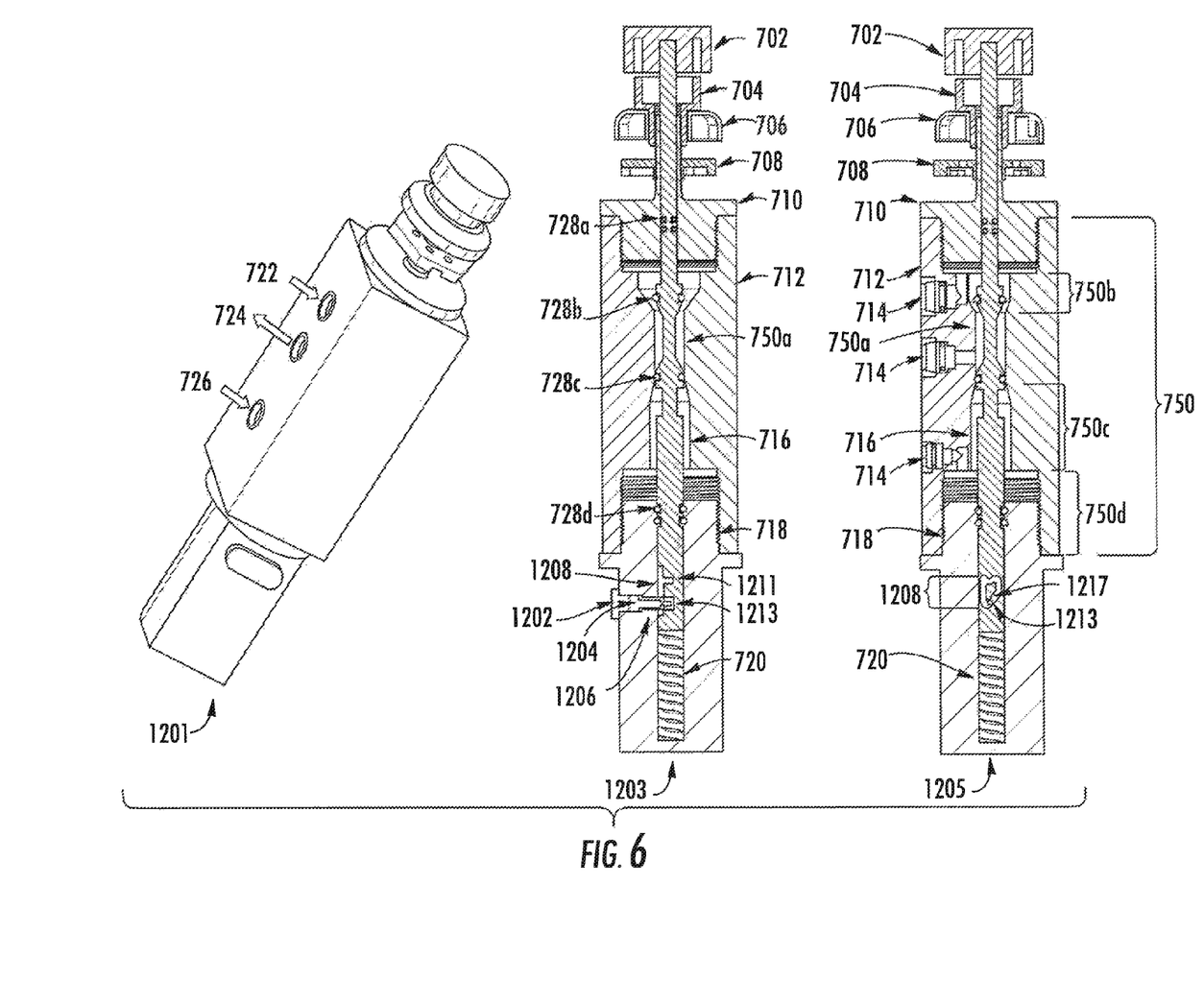
FIG. 6 illustrates an isometric view and cross-section views of the diverter apparatus, in accordance with a non-limiting example embodiment of the invention.

FIG. 6 illustrates an isometric view 1201, a cross-section view of the right plane 1203 and a cross-section view of the front plane 1205 of the diverter device 602, in accordance with such an embodiment of the invention. As seen in the illustrated views, an example diverter device 602 in accordance with at least one embodiment of the invention, includes button 702, which is pushed to activate the diverter feature as described herein, monitor retainer 704, LED monitor 706 and vertical locating nut 708. Also, as seen in one or more of the figures detailed herein, FIG. 6 depicts diverter device 602 as including first (or top) plug 710, diverter body 712 (within which diverter channel 750 is located), speed fit cartridges and corresponding o-rings 714, stem body portion 716, bottom plug 718 and compression spring 720.

Additionally, the stem body 716 includes o-rings 728a-728d, as well as a latching track 1208 defined therein. Additionally, the second (or bottom) plug 718 includes pin retainer 1202, pin 1204 and pin sleeve 1206, further described herein. The isometric view 1201 also depicts untreated inlet channel 722 for the introduction of untreated fluid (for example, water) into the diverter device 602, outlet channel 724 for the passage of fluid out of the diverter device 602 to a faucet (e.g., 604), and filtered inlet channel 726 for the introduction of filtered fluid into the diverter device 602.

In an embodiment such as depicted in FIG. 6, the diverter device 602 is mechanically moved from untreated mode to treated mode and back via button 702 normally located above the countertop (e.g., 650) or sink (e.g., 606). The stem body portion 716 features an ambient seal, an untreated seal, a treated seal and a spring cavity seal (generated via o-rings 728), wherein the stem body portion 716 can be moved up and down into either the treated or untreated positions. At the bottom of the stem body portion 716 is defined latching track 1208, which engages a moving pin 1204 attached independently to the exterior body of the bottom plug 718 portion of the diverter device 602 in pin sleeve 1206 and contained via pin retainer 1202.

Within the latching track 1208 are two dwell points, upper dwell point 1211 and lower dwell point 1213, in which the pin 1204 will restrict movement of the stem body portion 716. Specifically, when button 702 is pressed, the stem body portion 716 will travel downward and the pin 1204 will move within latching track 1208 until the pin 1204 engages with an uppermost inner surface of the latching track 1208, which stops the travel of the pin 1204 and stem body portion 716. When the button is initially released, the stem body portion 716 is pushed back upward by the biasing compression spring 720 along with the latching track 1208 within the stem body portion 716. The pin 1204 is therein directed by the geometry of the latching track 1208 (which is, as noted, moving upward with the stem body portion 716) to a point where the pin 1204 is caught by and stops at the upper dwell point 1211, thereby latching the stem body portion 716 into activated/treated position. The flow path in this position is the same as detailed in connection with view 1104 of FIG. 7.

Additionally, when button 702 is pressed again to transition from activated/treated mode to inactivated/untreated mode, the stem body portion 716 along with the integral latching track 1208 is moved downward until the pin 1204 once again pushes against an uppermost inner surface of the latching track 1208. The upper dwell point 1211 is positioned at a point below the uppermost inner surface of the latching track 1208, which angles away from the dwell point 1211 and drives the pin 1204 outward such that the pin 1204, after the button 702 is released, will be positioned in a side channel of the latching track as the compression spring 720 pushes the stem body portion 716 back up to a point where the pin 1204 eventually engages the bottommost inner surface of the latching track 1208 and is directed to the lower dwell spot 1213 via the angle on the lower surface of the latching track 1217. When the button 702 is released, the stem body portion 716, still biased upward by the compression spring 720, is pushed upward until the pin 1204 rests in the lower dwell spot 1213 (for instance, at the bottom of latching track 1208), thereby latching the stem body portion 716 into inactivated/untreated position. The flow path in this position is the same as detailed in connection with view 1102 of FIG. 7.

As noted above, surrounding the stem body portion 716 are components of the diverter device, which includes the top plug 710, the diverter body 712 and the bottom plug 718. The top plug 710 connects to and seals the stem body portion 716 and diverter body 712 at a first (or upper) portion and provides a threaded penetration column that fits into the penetration hole in the countertop (e.g., 650) or sink (e.g., 606). The second (or bottom) plug 718 principally seals the diverter body 712 and retains the compression spring 720 relative to the stem body portion 716. The diverter body 712 defines the internal flow path between the two inlet channels (722 and 726) and the common outlet channel 724 and provides a common, continuous and cylindrical sealing surface in the central axis for both the treated and untreated paths to the outlet channel 724. Both inlet channels (722 and 726) and the common outlet channel 724 utilize speed fit cartridges and corresponding o-rings 714.

Figure 7:
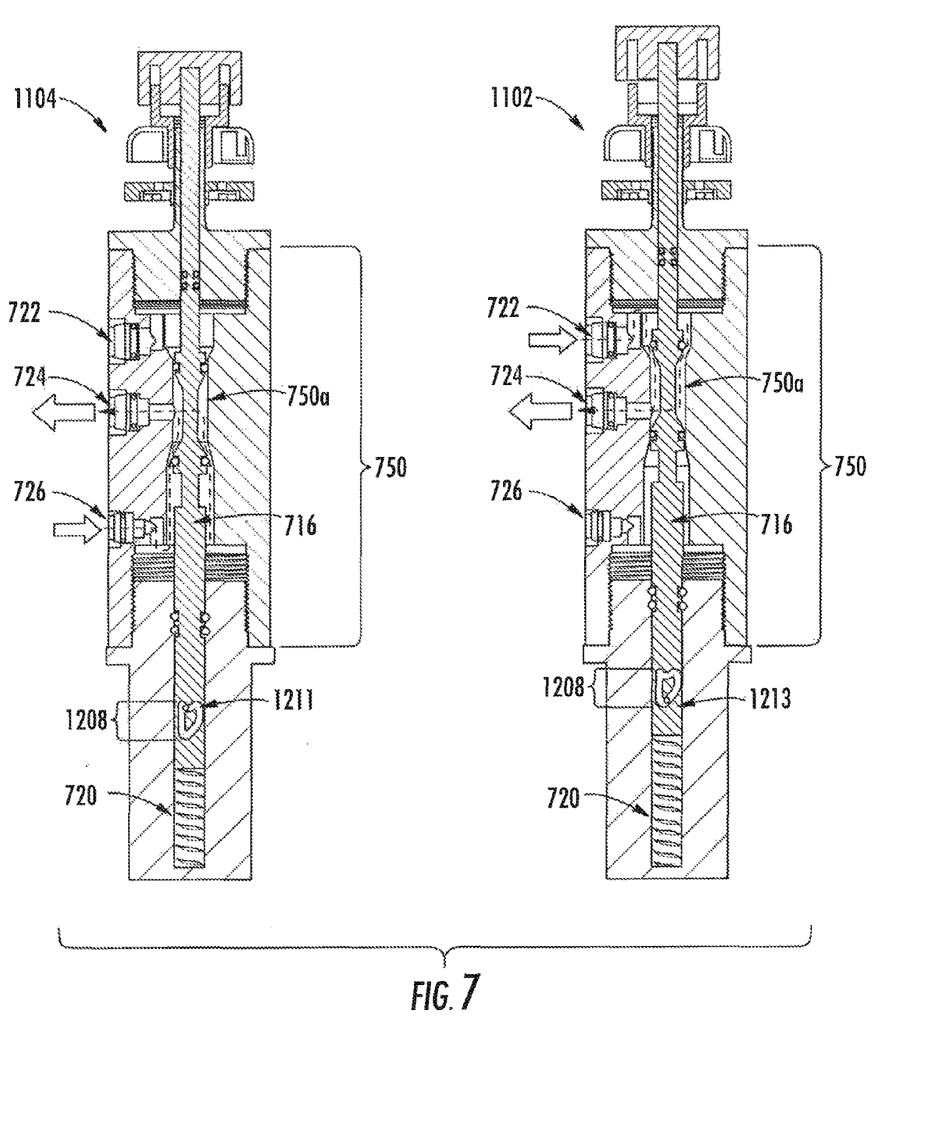
FIG. 7 illustrates the flow path in both the inactivated and activated diverter positions, in accordance with a non-limiting example embodiment of the invention.

FIG. 7 illustrates the flow path in both the inactivated and activated diverter positions, in accordance with a non-limiting example embodiment of the invention. As seen in the inactivated/untreated mode 1102 (and similar to the description of FIG. 4 above), untreated fluid enters the diverter device 602 via untreated inlet channel 722 and travels around stem body portion 716 through diverter channel 750 towards outlet channel 724. The fluid can continue through and out outlet channel 724 because the o-ring 728 at that position of the stem body portion 716 is engaged with the diverter channel 750 in the stem-up inactivated mode, creating a seal in diverter channel 750 and blocking fluid from continuing past its position in the diverter channel 750 as well as blocking fluid from entering channel 724 from filtered inlet channel 726. As described above in connection with FIG. 6, in this inactivated/untreated mode, button 702 is pressed by a consumer, the stem body portion 716 engages with compression spring 720 to release the pin 1204 from the upper dwell point 1211 of latching track 1208 and the pin 1204 moves within latching track 1208 until the pin 1204 engages with the lower dwell point 1213, thereby latching the stem body portion 716 into position.

Additionally, as seen in the activated/treated mode 1104 (and similar to the description of FIG. 5 above), a seal is created in diverter channel 750 precluding untreated fluid from travelling through diverter channel 750 towards the outlet channel 724. Instead, in the activated mode, fluid enters diverter device 602 via filtered inlet channel 726 and travels around the stem body portion 716 through diverter channel 750 towards outlet channel 724 because the o-ring 728 at the outlet position of the stem body portion 716 is not engaged with diverter channel 750, permitting fluid to continue around the step body portion 716 in the diverter channel 750 to the outlet channel 724. As also described in connection with FIG. 6, in this activated/treated mode, button 702 is pressed by a consumer, the stem body portion 716 is compressed down and the pin 1204 moves within latching track 1208 until the pin 1204 engages with the upper dwell point 1211, thereby latching the stem body portion 716 into position.

Figure 8:
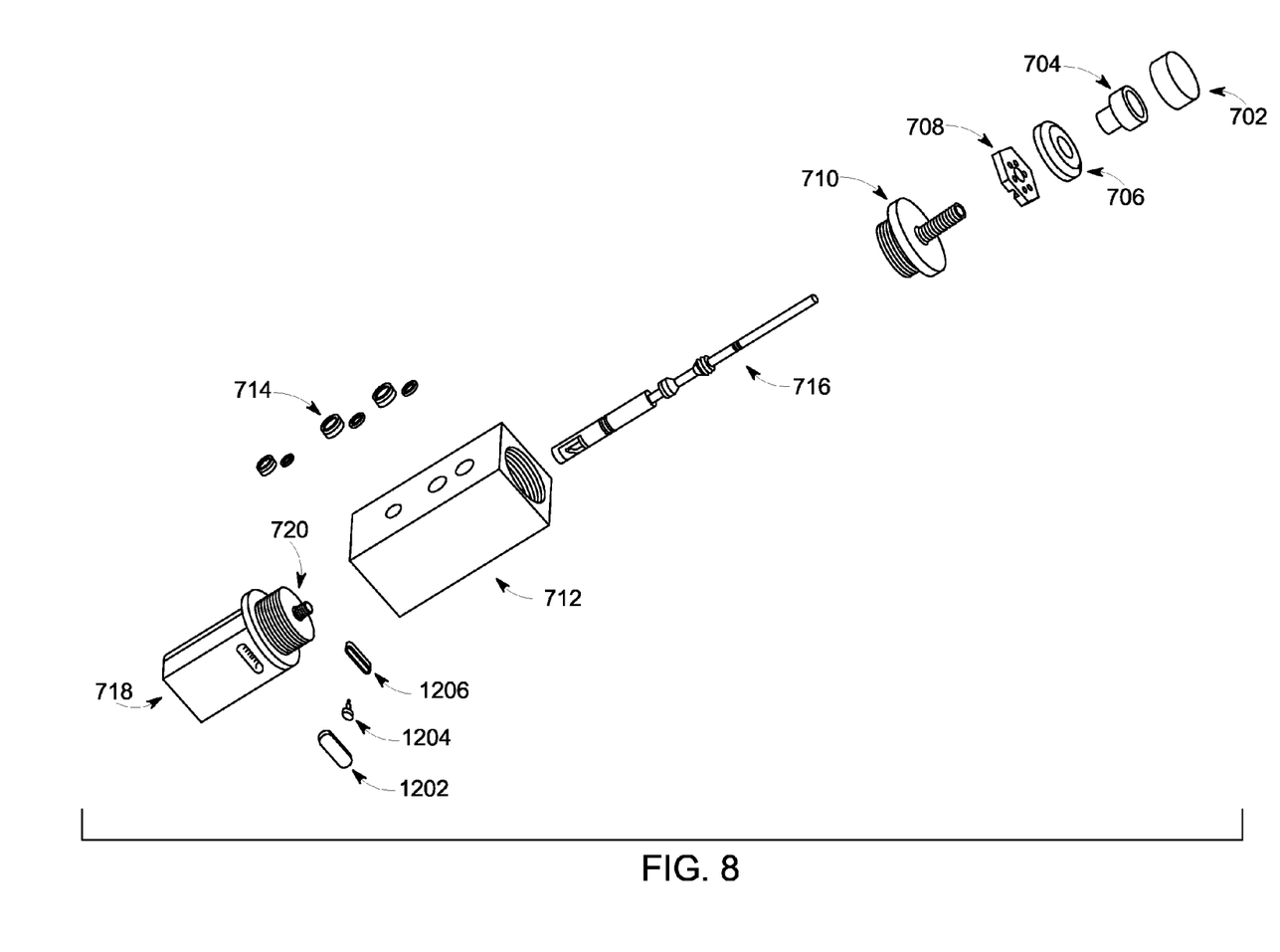
FIG. 8 illustrates an exploded view of various components of the diverter apparatus, in accordance with a non-limiting example embodiment of the invention.

FIG. 8 illustrates an exploded view of various components of the diverter device 602, in accordance with a non-limiting example embodiment of the invention. By way of illustration, FIG. 8 depicts button 702, monitor retainer 704, LED monitor 706 and vertical locating nut 708. Also, FIG. 8 depicts top plug 710, stem body portion 716, diverter body 712, speed fit cartridges and corresponding o-rings 714, compression spring 720 and bottom plug 718. Additionally FIG. 8 depicts pin retainer 1202, pin 1204 and pin sleeve 1206.

Accordingly, while there have shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A flow diverter device comprising:
   a diverter body defining therein a diverter channel that connects with two inlet channels and an outlet channel;
   a diverter valve stem defining a latching track and comprising a first sealing mechanism and a second sealing mechanism, wherein the diverter valve stem is movable between a first position wherein one of the first or second sealing mechanisms engages the diverter channel such that the diverter channel fluidly connects one of the inlet channels with the outlet channel only and a second position wherein the other of the first or second sealing mechanisms engages the diverter channel such that the diverter channel fluidly connects the other of the inlet channels with the outlet channel only;
   a plug enclosing a first portion of the diverter stem valve, the plug defining a pin sleeve directed towards the latching track; and
   a pin disposed through the pin sleeve in engagement with the latching track.

2. The flow diverter device of claim 1, wherein the first sealing mechanism includes a first shoulder defined on the diverter valve stem, and the second sealing mechanism includes a second shoulder defined on the diverter valve stem.

3. The flow diverter device of claim 1, wherein the plug seals said portion of the diverter valve stem and the diverter body.

4. The flow diverter device of claim 1, further comprising a pin retainer disposed in the plug.

5. The flow diverter device of claim 1, further comprising a second plug encasing a second portion of the diverter valve stem, wherein the plug seals said second portion of the diverter valve stem and the diverter body.

6. The flow diverter device of claim 1, wherein a first depression of the diverter selection mechanism moves the diverter valve stem and causes the pin to move within the latching track until the pin engages with a first dwelling point of the latching track to latch the diverter valve stem into the first position.

7. The flow diverter device of claim 6, wherein a second depression of the diverter selection mechanism further depresses the diverter valve stem to engage the compression spring to release the pin from the first dwell point and cause the pin to move within the latching track until the pin engages with a second dwell point to latch the diverter valve stem into the second position.

8. The flow diverter device of claim 1, further comprising a diverter selection mechanism connected to the diverter valve stem, wherein depression of the diverter selection mechanism moves the diverter valve stem between the first position and the second position.

9. The flow diverter device of claim 8, wherein the diverter selection mechanism comprises a button.

10. The flow diverter device of claim 8, wherein the latching track comprises two dwell points.

11. The flow diverter device of claim 10, further comprising a compression spring operative to bias the diverter valve stem.

12. A water filtration system comprising:
a faucet;
a water filter apparatus; and
a flow diverter device positioned upstream from the faucet to direct a water flow thereto, the flow diverter comprising:
 a diverter body defining therein a diverter channel that connects with two inlet channels and an outlet channel,
 a diverter valve stem comprising at least two sealing mechanisms, wherein the diverter valve stem is movable between a first position wherein one of the sealing mechanisms engages the diverter channel such that the diverter channel fluidly connects one of the inlet channels with the outlet channel only and a second position wherein another of the sealing mechanisms engages the diverter channel such that the diverter channel fluidly connects the other of the inlet channels with the outlet channel only, the diverter valve stem defining a latching track comprising an upper dwell point and a lower dwell point,
 a plug enclosing a first portion of the diverter stem valve, the plug defining a pin sleeve directed towards the latching track,
 a pin independently disposed through the pin sleeve in engagement with the latching track, and
 a pin retainer disposed on the plug over the pin sleeve to contain the pin.

13. The system of claim 12, wherein one of the inlet channels is fluidly connectable to an unfiltered fluid source.

14. The system of claim 12, wherein the other of the inlet channels is fluidly connectable to a filtered fluid source.

15. The system of claim 12, further comprising a diverter selection mechanism connected to the diverter valve stem, wherein depression of the diverter selection mechanism moves the diverter valve stem between the first position and the second position.

* * * * *